United States Patent [19]
Sperling et al.

[11] 3,833,404
[45] Sept. 3, 1974

[54] VIBRATION OR SOUND DAMPING COATING FOR VIBRATORY STRUCTURES

[75] Inventors: Leslie H. Sperling, Bethlehem; David A. Thomas, Lower Saucon Township, both of Pa.

[73] Assignee: Research Corporation, New York, N.Y.

[22] Filed: May 31, 1972

[21] Appl. No.: 258,391

[52] U.S. Cl.............. 117/63, 117/72, 117/75, 117/DIG. 3, 181/33 GA, 204/159.16, 260/885, 284/358 R
[51] Int. Cl.............................................. F16f 15/00
[58] Field of Search............ 181/33 GA; 248/358 R; 188/1 B; 117/72, 75, 63, DIG. 3, 132 C

[56] References Cited
UNITED STATES PATENTS

| | | | |
|---|---|---|---|
| 3,041,306 | 6/1962 | Baer | 260/881 X |
| 3,041,309 | 6/1962 | Baer | 260/881 X |
| 3,055,859 | 9/1962 | Vollmert | 260/881 X |
| 3,271,188 | 9/1966 | Albert et al. | 181/33 GA |
| 3,357,850 | 12/1967 | Baker | 117/75 X |
| 3,399,104 | 8/1968 | Ball et al. | 248/358 R X |
| 3,426,101 | 2/1969 | Ryan et al. | 260/876 |

*Primary Examiner*—Ralph Husack
*Attorney, Agent, or Firm*—Harold L. Stowell

[57] ABSTRACT

Damping means for a vibratory part comprising an inner layer of visco-elastic polyblended material comprising an interpenetrating polymer networks composition consisting essentially of 5–95 percent by weight of an elastomer (e.g., polyethyl acrylate) and 95–5 percent by weight of a plastic (e.g., polystyrene, polymethylmethacrylate), applied to said part, and an outer plastic constraining layer applied over said viscoelastic material.

15 Claims, 2 Drawing Figures

VIBRATION OR SOUND DAMPING COATING FOR VIBRATORY STRUCTURES

The invention described herein was made in the course of work under a grant or award from the National Science Foundation.

BACKGROUND OF THE INVENTION

The present invention relates to damping of vibratory and/or noise emitting structures such as tools, machine parts, engine housings, transformer housings, automotive vehicles, etc. More particularly, the invention relates to a means comprising a surface layer or coating for damping vibratory or noise emitting surfaces.

Many surface coatings have been heretofore proposed for damping vibratory surfaces. To date, however, none have exhibited a suitable degree of efficiency over a sufficiently wide temperature range to justify their widespread use in various applications. Thus, many vibratory surfaces such as those in high speed engines, electrical equipment, etc., attain relatively high temperatures. Other equipment must be operated at temperatures both above and below ambient. To date, no damping surface material has been proposed which is capable of effective damping throughout the broad temperature ranges normally encountered in practical use.

Moreover, the means previously employed for damping vibratory surfaces have been difficult to apply to and adhere to the surface. It has generally been necessary to cover the surface with a preformed damping layer which is difficult to adhere to the surface or to apply highly viscous coatings thereto which are difficult to control as to thickness, etc.

SUMMARY OF THE INVENTION

The present invention comprises a damping means for a vibratory or noise emitting part or surface comprising an inner layer or coating of viscoelastic material applied to and adhered to the vibratory surface, and an outer plastic constraining layer applied over and adhered to the viscoelastic material. The viscoelastic material is comprised of an interpenetrating polymer network composition or polymer blend consisting essentially of 5–95 percent by weight of crosslinked plastic, and 95–5 percent of crosslinked elastomer, the networks being essentially independently crosslinked.

DETAILED DESCRIPTION OF THE INVENTION

Damping of vibratory or noise emitting surfaces may be achieved by first adhering to the surface, preferably by coating, a layer of viscoelastic material as described above. A constraining layer of plastic is then adhered to the first layer, preferably by coating, to complete the vibration damping system.

Figure 1:
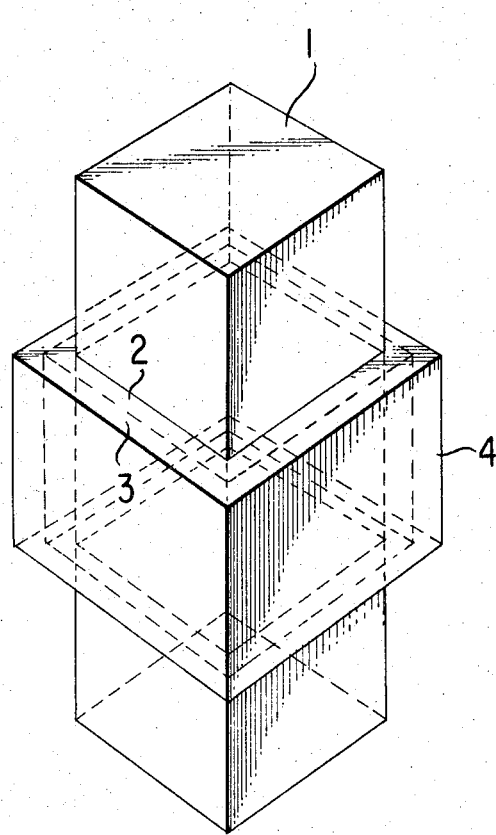

The invention is illustrated by reference to FIG. 1 of the drawing. Reference numeral 1 designates the vibratory part to be damped. The damping system 4 comprises the inner viscoelastic layer 2 and the outer plastic constraining layer 3.

The interpenetrating polymer networks (hereinafter termed IPN) comprising the viscoelastic material are described in copending application Ser. No. 35,280 of Sperling, filed May 6, 1970 now abandoned in favor of application Ser. No. 270,166, filed July 10, 1972. The compositions are prepared by incorporating a monomer plus crosslinking agent into an already existing crosslinked polymer network and then polymerizing the monomer in situ to form a second polymer network. Both polymer networks are continuous throughout the composition and are relatively chemically independent. The unique feature of interpenetrating polymer networks (IPN) is the fact that the networks are caused to interpenetrate each other on a molecular scale, i.e., both networks extending through large regions of space. The introduction of crosslinking agents in each component of the IPN prevents gross phase separation and encourages an intimate admixing and interpenetration of the respective polymeric constituents. Although some residual graft copolymerization may occur, the respective polymeric networks are essentially chemically independent. However, it is to be understood that grafting does not deter damping. Generally, grafting up to about 25 percent based on the weight of the mers involved in the reaction is permissible.

The ability of the viscoelastic layer to exhibit broad spectrum damping is based upon the fact that gross phase separation therein is suppressed due to crosslinking in each component network. In the absence of the crosslinking agent the intimate and extensive admixture and interpenetration of the respective networks breaks down due to phase separation such that large areas or islands of only one component are formed throughout the viscoelastic layer. This breakdown reduces the temperature range over which the layer is an effective vibration damper.

The so-called graft copolymers of the prior art are also inefficient since a large fraction of the molecules are really homopolymer rather than true grafts. The phases therefore tend to be much larger and more readily separable with an attendant reduction in damping efficiency.

Generally, amounts of crosslinking agent are included in each component of the interpenetrating polymer networks to provide from about 0.10 to about 25 percent crosslinking based on the weight of the mers involved in the crosslinking reaction.

While virtually any elastomer-plastic pair may be employed to prepare the IPN, it is preferred that the formed polymers be semi-compatible, i.e., partly miscible and having glass-transitions or softening points near the highest and lowest temperatures of intended utilization. The semi-compatible IPN's yield broad damping spectra, i.e., useful damping over a wide temperature range.

Generally, the IPN is formed by incorporating a second monomer and crosslinking agent therfor into a previously crosslinked polymer material, preferably by swelling, and then polymerizing and crosslinking the second monomer in situ to form an independent and interpenetrating second polymer network. The constraining layer is then applied thereover. Alternatively, an excess of plastic forming monomer can be applied to an elastomer coated surface. Part of the monomer is swelled into the elastomer and part remains as a coating thereon. Upon polymerization and crosslinking, the IPN and constraining layer are formed simultaneously and are integrally bonded together.

Polymerization of the respective networks can be achieved according to conventional methods, i.e., ultraviolet irradiation, heat-catalysis, etc.

The plastic layer must be hard and stiff, preferably having a Young's modulus greater than $1 \times 10^{10}$ dynes/cm² at the temperature of intended use. Epoxy based plastic resins, preferably reinforced with particulate and/or fibrous fillers, are preferred. Other plastic forming materials, such as acrylics, phenol-formaldehyde resins, etc. are also suitable.

The only other requirements for the plastic constraining layer are that it have the requisite heat stability for the intended application and that it be capable of forming a strong bond with the IPN layer.

In a preferred method, the IPN is prepared in latex form via emulsion polymerization. To the first crosslinked polymer network, either plastic or elastomeric but preferably plastic in the form of a seed latex, is added the second monomer together with crosslinking agent. Polymerization of the second network via emulsion polymerization techniques completes the latex IPN. The final concentrations of polymer dispersed in the aqueous phase may be from 5 to 60 percent by weight, but preferably between 20 and 45 percent.

The latex, after mixing with conventional fillers, stabilizers, thickeners, etc., as desired, is then applied in the form of a coating via brush, roller, spray gun equipment, dipping, or other standard techniques to the surface to be damped. After drying, the plastic constraining layer is applied by similar techniques. After hardening, the damping system is ready for duty. The first coat should be allowed to harden or dry prior to application of the constraining layer. The latter should then be allowed to harden prior to use of the damped structure.

The vibration damping characteristics of the viscoelastic coating may be enhanced by incorporating fillers therein. Particularly valuable are the platelet-type fillers such as mica, etc. These tend to align along the plane of the surface to be damped forming a layer-like cross-section. This layering effect operates to reinforce the viscoelastic layer and emphasize its vibration damping qualities.

Suitable elastomers for forming the IPN layer should have Young's moduli below $1 \times 10^{10}$ dynes/cm² at the temperature of intended use. Suitable materials include poly (alkyl acrylates), such as poly (ethyl acrylate) or poly (butyl acrylate), poly (vinyl acetate), polyurethanes, polybutadiene, natural rubber, silicone rubber, butyl rubber, chloroprene, ethylenepropylene terpolymer elastomers, polyvinyl alcohol, thiokol rubber and copolymers thereof.

Suitable plastics for forming the IPN should have Young's moduli greater than $1 \times 10^{10}$ dynes/cm² at use temperature, and include the poly (alkyl methacrylates), such as poly (methyl methacrylate) or poly (ethyl methacrylate), polystyrene, poly (α-methyl styrene), the poly (1-alkenes) such as poly (propylene), poly (acrylic acid), and copolymers thereof. A preferred combination of plastic and elastomer is poly (ethyl methacrylate) and poly (butyl acrylate) respectively, in 50/50 proportions.

Suitable plastics for the constraining layer include epoxy resin formulations, phenol-formaldehyde resins, melamine resins, polyurethane plastics and foams, polystyrene, poly (α-methyl styrene), poly (methyl methacrylate) and other poly (alkyl methacrylates), polyphenylene oxide, polycarbonates, polysulfones, polyimides, polyacrylonitrile, ABS plastics, polyvinyl chloride, polytetrafluoroethylene and other fluorinated polymers, polyamides, polyesters, unsaturated polyester resins, poly acetals, phenolic resins, amino resins, such as the melamines and ureas, and cellulose ester materials. Stiffening fillers such as finely divided silicas or carbon black, or fibrous fillers such as glass fibers or asbestos fibers may be added in amounts between 5 and 60 percent by weight. A preferred constraining layer is epoxy resin filled with a mixture of silica and carbon black to a level of 30 percent.

The thicknesses of the various coatings is not overly critical and is dependent upon the particular application contemplated. Generally, the thickness of the viscoelastic layer may range from about one to about 100 mils while the thickness of the plastic constraining layer may vary from about one to about 100 mils.

These materials can also be coated on repeatedly, to build up damping systems several layers thick, having alternate layers of IPN damping material and constraining plastic.

Suitable crosslinking agents for the plastic materials and elastomers include divinyl benzene, tetraethylene glycol dimethacrylate, and other multi-double bond containing monomers.

EXAMPLE 1

A mixture of ethyl acrylate (100 parts), tetraethylene glycol dimethacrylate (crosslinker) (2 parts) and benzoin (0.3 parts) (activator) was photopolymerized in the form of a film on the substrate to be damped. Subsequently a mixture of styrene (100 parts), divinyl benzene (crosslinker) (2 parts), and benzoin (0.3 part) was swelled into the surface of said film, and photopolymerized before swelling equilibrium was achieved. The said polystyrene forms both the plastic component of the IPN and the plastic constraining layer.

Several aluminum reeds 5 inches × 1 inch × 0.1 inch were coated as above for one inch near the base to be gripped. Total thickness of coat was about 100 mils. Upon being set into vibratory motion, the time for sensible vibration to cease was recorded.

| Sample No. | % Polystyrene | Vibration Time, Seconds |
|---|---|---|
| 1 | no polymer coating | 5 |
| 2 | 0 | 5 |
| 3 | 30% | 3 |
| 4 | 40% | 1.5 |

EXAMPLE 2

Latex IPN's based on poly (N-butyl acrylate) and poly (ethyl methacrylate), were prepared via emulsion polymerization. The following recipes were employed:

To 300 parts of stirred, deairated, deionized water held at 60° C were added 50 parts of a 10 percent sodium lauryl sulfate solution and 5 parts of 5 percent potassium persulfate solution. 30 parts of ethyl methacrylate monomer containing 0.4 percent tetraethylene glycoldimethacrylate (crosslinker) were added dropwise over a 15 minute period, during which time polymerization occurs, followed by 30 parts of n-butyl acrylate monomer containing 0.4 percent tetraethylene glycol dimethacrylate (crosslinker) over a similar period of time, during which time the second monomer polymerizes. A test film was cast from this latex. The procedure was repeated, this time polymerizing the n-butyl acrylate first, followed by polymerizing the ethyl methacrylate, both by heating.

Figure 2:
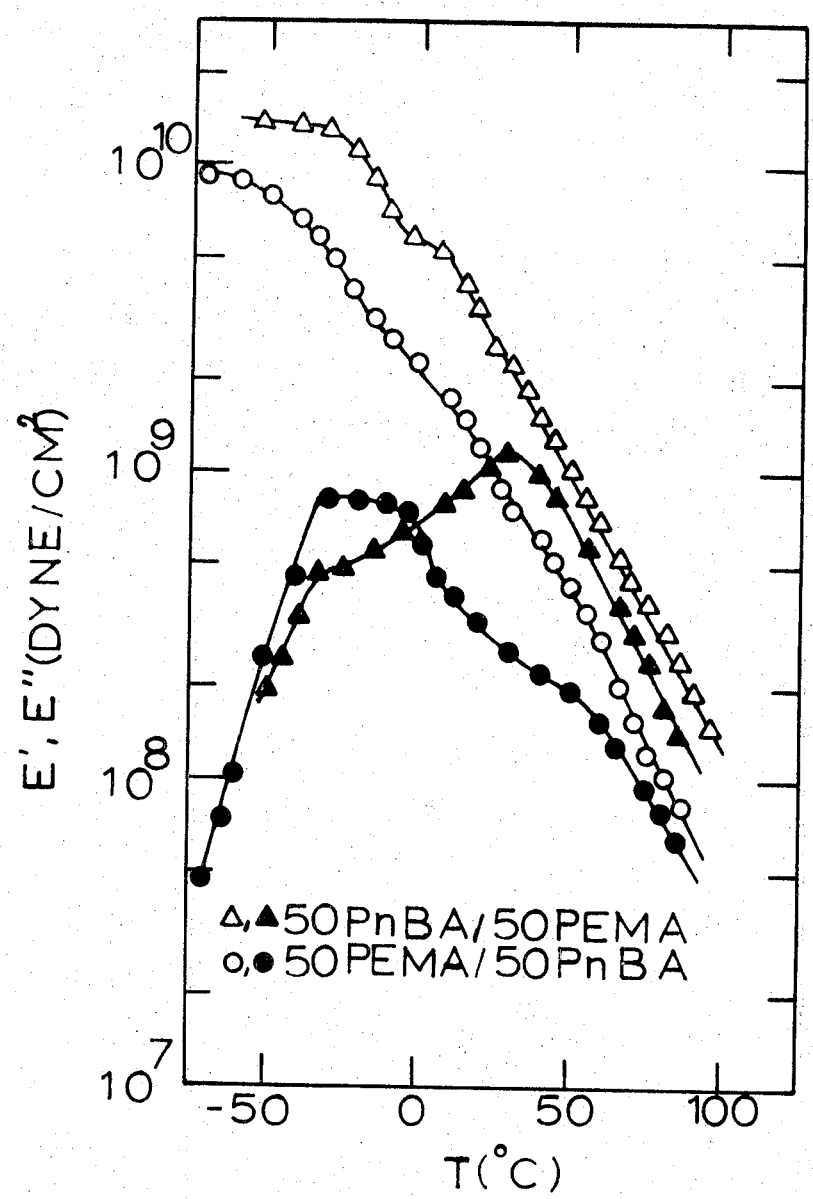

The storage and loss moduli (E' and E" respectively) of these two films was recorded as a function of temperature in FIG. 2. The damping quality is given by the height of the E" values, filled circles and triangles. It is important to note that high damping is attained from −50° C to +75° C, a range of 125° C. Ordinary homopolymers exhibit damping only over a 20° to 30° C range.

Portions of these latex materials were painted or coated onto test objects such as bells. After being constrained with silica/carbon black reinforced epoxy resins, based on diglycidyl ethers of bisphenol-A, with polyamines as curing agents, great reductions in sound level were observed.

We claim:

1. Damping means for vibratory part comprising an inner layer of viscoelastic material applied to said part and an outer plastic constraining layer applied over and adhered to said viscoelastic layer; said viscoelastic material comprising a composition of interpenetrating polymer networks consisting essentially of 5–95 percent by weight of an elastomer having a Young's modulus below $1 \times 10^{10}$ dynes/cm$^2$ and 95–5 percent by weight of a plastic having a Young's modulus greater than $1 \times 10^{10}$ dynes/cm$^2$, said networks being essentially independently crosslinked and continuous.

2. The damping means of claim 1 wherein the elastomer is poly (ethyl acrylate).

3. The damping means of claim 1 wherein the plastic in said viscoelastic material is poly (methyl methacrylate).

4. The damping means of claim 1 wherein the plastic in said viscoelastic material is polystyrene.

5. The damping means of claim 1 wherein said inner layer of viscoelastic material is applied to said part in the form of a latex.

6. The damping means of claim 1 wherein said outer plastic layer comprises a plastic selected from the group consisting of polystyrene, poly (methyl methacrylate) and epoxy resins.

7. The damping means of claim 1 wherein said outer plastic constraining layer comprises a filler reinforced plastic.

8. A method for damping a vibratory surface comprising adhering a layer of viscoelastic material to said surface and adhering over said layer of viscoelastic material a constraining layer of plastic; said viscoelastic material comprising a composition of interpenetrating polymer networks consisting essentially of 5–95 percent by weight of an elastomer having a Young's modulus below $1 \times 10^{10}$ dynes/cm$^2$ and 95–5 percent by weight of a plastic having a Young's modulus greater than $1 \times 10^{10}$ dynes/cm$^2$, said networks being essentially independently crosslinked.

9. The method of claim 8 wherein said layers are respectively adhered by coating.

10. The method of claim 8 wherein the elastomer is poly (ethyl acrylate).

11. The method claim 8 wherein the plastic in said viscoelastic material is selected from the group consisting of polystyrene and poly (methyl methacrylate).

12. The method of claim 8 wherein the plastic in said constraining layer of plastic is selected from the group consisting of polystyrene, poly (methyl methacrylate) and epoxy resins.

13. The method of claim 8 wherein said viscoelastic material is applied to said surface by coating thereon a layer of said crosslinked elastomer or plastic, swelling said layer with a coating of a monomer of the other of said elastomer or plastic and crosslinking agent and polymerizing said monomer to form said layer of interpenetrating polymer networks.

14. The method of claim 8 wherein said viscoelastic material is applied to said surface by coating thereon a latex of said interpenetrating polymer networks composition.

15. The method of claim 8 wherein said plastic constraining layer is a filler reinforced plastic.

* * * * *